United States Patent Office

3,769,335
Patented Oct. 30, 1973

3,769,335
DERIVATIVES OF AMINOALKANOIC ACIDS
Aldo Garzia, Lodi, Italy, assignor to Instituto
Chemioterapico Italiano S.p.A., Milan, Italy
No Drawing. Filed June 26, 1970, Ser. No. 50,328
Int. Cl. C07c 103/32
U.S. Cl. 260—519     4 Claims

ABSTRACT OF THE DISCLOSURE (3,4,5-dialkoxy-monohydroxy benzoyl) amino alkanoic acids and their pharmaceutically-acceptable salts for prophylaxis and treatment of cardiac disorders.

BACKGROUND OF THE INVENTION

This invention relates to a method of prophylaxis and treatment of cardiac disorders. In a particular aspect it relates to a method of treating ischemic cardiopathy prior to or following a cardiac infarction, disorders of rhythm, and disorders of stimulus transmission by the administration of an aminoalkanoic acid derivative.

The prevention and treatment of cardiac disorders, such as ischemia, thrombosis, cardiac infarction and disorders of rhythm and stimulus transmission, is a serious problem. Many studies have been conducted in an effort to ascertain the underlying causes and to develop a suitable method of preventing or treating these serious problems, particularly cardiac insufficiency and cardiac infarction. The pharmacological methods which have been proposed for preventing cardiac infarction include lowering of blood cholesterol levels, relaxation of the arteries and administration of anticoagulants. Ventricular fibrillation is a highly dangerous condition which is treated by electric shock administered to the heart muscle, and other rhythm and transmission disorders respond to installation of "pacemaker" device.

While the use of these methods has greatly improved the prognosis of cardiac patients, the problem of cardiac disorders generally still remains a severe one and in particular the problems caused by infarction are still grave.

SUMMARY OF THE INVENTION

It is an object of this invention to provide a method of prophylaxis and treatment of cardiac disorders.

It is another object of this invention to provide novel pharmaceutical compositions suitable for the prophylaxis and treatment of cardiac disorders.

Another object of this invention is to provide a method of prophylaxis and prevention of ischemic cardiopathy, cardiac infarction and disorders of rhythm and stimulus transmission by the administration of the derivatives of aminoalkanoic acids.

Other objects of this invention will be readily apparent to those skilled in the art from the disclosure herein.

It has been discovered that administration of compounds corresponding to the following formula

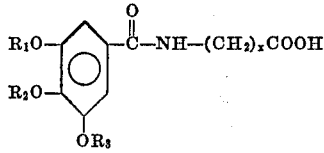

where $x$ is an integer of 3–8, and each of $R_1$, $R_2$ and $R_3$ is hydrogen, methyl, ethyl or propyl, provided that only one of $R_1$, $R_2$ and $R_3$ is hydrogen, or their pharmaceutically-acceptable salts, is effective in the prophylaxis and treatment of cardiac disorders such as cardiac ischemia and infarction, disorders of rhythm and disorders of stimulus transmission. The compound is administered at a dosage of 2–8 grams per day per average 60–70 kg. individual. When administration is by intravenous or intraperitoneal injection, soluble, pharmaceutically acceptable salts of the compounds of this invention are preferred.

DETAILED DISCUSSION

The compounds of the present invention are prepared by reacting the appropriate acetyl derivative of the 3,4,5-dialkoxy-monohydroxybenzoyl chloride with the corresponding aminoalkanoic acid at a temperature of about −5 to +5° C. According to the process of this invention, the free amino acid is slurried in about an equal weight of water and is neutralized with sodium hydroxide solution (about 30% by weight). Excess sodium hydroxide is added to promote the reaction. The mixture is chilled to within −5° to +5° C., and the acetyl derivative of the tri-substituted benzoyl chloride is gradually added with agitation, maintaining the temperature at below 5° C. The mole ratio of amino acid to the acid chloride is generally about 1–1.5:1. The resulting solution is stirred for from two to four days and when the reaction is complete can be treated with char to decolorize it. It is then neutralized with dilute $HClH_2SO_4$ to about a pH of 3 or a Congo red indicator endpoint. The resulting precipitate is separated, e.g. by filtration or centrifugation, washed with water, dried, then recrystallized from water or ethanol, separated by filtration, centrifugation or decantation and dried. Syringic acid and ϵ-aminocaproic acid are available in commercial quantity and the commercial grade materials are suitable for preparing the products of this invention. The corresponding aminovaleric, aminobutyric, aminoheptanoic, aminooctanoic and aminononanoic acids are prepared by known methods by the HCl-catalyzed hydrolysis of the corresponding lactams, which are known in the art. The salts thus obtained are then passed through an ion-exchange resin bed to obtain the free amino acid.

According to the method of the present invention, compounds corresponding to the formula given hereinbefore are administered for the treatment of cardiac ischemia, either prior to or following a cardiac infarction, disorders of the rhythm whether related to the infarction or not, and disorders of stimulus transmission. Administration of these compounds is an effective prophylaxis in cases of an impending cardiac infarction and an effective treatment after infarction has occurred. According to one embodiment of the present invention, the method is employed in veterinary medicine, principally in the treatment of household pets, especially dogs, where cardiac problems are frequently encountered.

Cardiac infarction frequently occurs without prior symptoms or before the patient has sought treatment for the relief of symptoms. However physicians are frequently able to detect symptoms of an approaching crisis and the administration of the compounds of this invention can be started promptly to obtain prophylactic effects.

The products of the present invention are of a low-order of toxicity and no side effects are observed in clinical trials. Pharmacological studies indicate that the principal effect of the compounds of the invention is on the heart. The only observed effect on the circulatory system was an increase in the static blood pressure with no significant change in mean arterial pressure.

The dosage in which the compounds of the present invention can be given can vary widely within rather broad limits. Good results have been obtained with as little as 25 mg./kg./day and as much as 500 mg./kg./day. In human clinical cases, all of the disorders cited above generally respond to a dosage of 2–8 grams per day per person, preferably about 6 grams per day. This dosage is intended for an average 60–70 kg. individual, equivalent to a dosage generally within the range of about 25–200 mg./kg./day. A dosage in the range of about 40–100 mg./kg./day is preferred. The treatment can consist of a single daily dose, or the above dosages can be given fractionally at periodic intervals. A single daily dose is generally preferred for a treatment of cardiac infarction and associated disorders but for prophylaxis, smaller periodic doses, e.g. a 500 mg. dose, 6 times daily, is preferred.

Administration of the compounds of this invention can be oral, subcutaneous, intravenous or intraperitoneal. When the compounds of the present invention are by subcutaneous, intraperitoneal or intravenous injection, they are administered as their water-soluble neutral salts. Any soluble, pharmaceutically-acceptable salt is suitable and the sodium and potassium salts are preferred. The sodium salt is particularly preferred. For oral administration the compounds are preferably administered as the free acids but they can also be pharmaceutically-acceptable salts, e.g. as the ammonium, sodium, potassium, magnesium or calcium salt. According to one suitable method, the free acids can be administered mixed with a molar equivalent of sodium or potassium bicarbonate. In the examples, the compounds were administered intraperitoneally as the sodium salt because of its ease of handling as an aqueous solution, but the weights given are for the free acid. When administered orally, the compounds are conveniently administered as tablets containing 500 mg. with a suitable binder, many of which are known.

Suitable tablets for human or animal use can conveniently be prepared containing 50–500 mg. of the compounds of the present invention, either as the free acid or as a pharmaceutically-acceptable salt thereof. Tablets containing as little as 50 mg. are suitable for oral administration, especially for infants and small children, and in veterinary medicine, for small animals. Tablets containing less than 50 mg. can be prepared, and in special cases may be useful, but generaly a dose smaller than 50 mg. is too small to be practical because in the average patient the number of tablets required per day would be excessively high for convenience. Tablets containing more than 500 mg. can also be prepared, but large tablets are difficult for most patients to swallow.

EXAMPLE 1

Forty and one-tenth grams (0.26 mole) of the hydrochloride of ε-aminocaproic acid in solution in 40 milliliters of water was neutralized with 5% sodium hydroxide solution. Then 32 grams of sodium hydroxide in 280 milliliters of water was added. Sixty two grams of the chloride of acetylsyringic acid was then added gradually at 5–10° C. This resulting mixture was stirred for three days and then acidified to pH 3 with dilute hydrochloric acid. A yellow solid precipitated and was filtered, washed with water and dried. The precipitate weighed 50 grams and melted at 95° C. The precipitate was recrystallized from 1400 milliliters of water, to give 44 grams of product melting at 99° C. This was recrystallized again from water, filtering at 65° C., to give a product melting at 100–101° C., assay, 97.1%. The product was syringoyl ε-aminocaproic acid having the structure

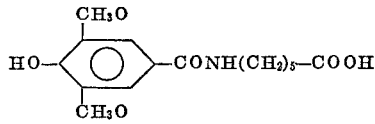

The oral toxicity was evaluated by converting the free acid to the sodium salt and administering to female rats weighing approximately 100 g. By intraperitoneal administration the $LD_{50}$ was 6 g./kg., which is more than 60 times the average contemplated daily dose.

EXAMPLE 2

The effect of the compound prepared according to the procedure of Example 1 on the heart was determined in rats by intravenous injection of 1 unit per kilogram of vasopressin (Pitressin, marketed by Parke, Davis Co.), an anti-diuretic pituitary hormone. As is known, the administration of vasopressin results in variations of the voltage and the morphology, or shape, of the T-wave. It also causes arrhythmia and produces ischemia of the myocardium. It was determined that these electrocardiographic alterations normally produced by the administration of Pitressin were prevented by the administration of the compound of Example 1.

EXAMPLE 3

The effect of the compound of Example 1 was determined on chloroform-epinephrine induced arrhythmias in rats. In the procedure employed, the rats were anaesthetized with urethane. Chloroform was administered for one minute by inhalation and then 100 micrograms/kg. of epinephrine hydrochloride was administered intravenously. Electrocardiograms were taken and the extent of the arrhythmia in terms of number of beats per minute was determined. The effect of the compound of Example 1 was substantially to reduce the extent of the arrhythmia when administered intraperitoneally in the amount of 700 mg./kg.

EXAMPLE 4

(3,4 - diethoxy-5-hydroxybenzoyl)-δ-aminovaleric acid is prepared in accordance with the procedure of Example 1 except that δ-aminovaleric acid is substituted for ε-aminocaproic acid. The resulting compound is tested for anti-Pitressin activity in rats as described in Example 2 and similar results are obtained.

EXAMPLE 5

(3,5 - diethoxy-4-hydroxybenzoyl)-γ-aminobutyric acid is prepared in accordance with the procedure of Example 1 except that γ-aminobutyric acid was substituted for ε-aminocaproic acid. The resulting compound is tested for anti-Pitressin activity in rats as described in Example 2 and similar results are obtained.

EXAMPLE 6

(3,4 - dipropoxy-5-hydroxybenzoyl)-ζ-aminoheptanoic acid is substituted for ε-aminocaproic acid. The resulting compound is tested for anti-Pitressin activity as described in Example 2 and similar results are obtained.

EXAMPLE 7

A pharmaceutical composition in tablet form was prepared by mixing 500 mg. of the compound of Example 1 with 50 mg. of corn starch and 50 mg. of sucrose. This mixture was compressed in a tableting machine to make a durable tablet. It is suitable for oral administration to humans or other animals suffering from cardiac disorders. It is particularly suitable for prophylaxis of a suspected impending coronary occlusion resulting in an infarction.

EXAMPLE 8

A pharmaceutical composition especially suitable for children and small animals is prepared according to the procedure of Example 7 except that the following amounts are employed: Compound of Example 1, 50 mg.; starch, 25 mg.; sucrose, 25 mg.

The acylation or arylmethylation of the hydroxyl group of the 3,4,5-dialkoxy-monohydroxy benzoic acid can be accomplished according to the procedure described in U.S. Pat. 3,432,549.

The above examples are representative. For example, the 3,4,5-trialkoxy benzoic acids are well known to the art. See, for example, U.S. Pats. 3,234,276; 3,364,249 and 3,485,865.

ε-Aminocaproic acid is available in commercial quantity and the commercial grade materials are suitable for preparing the products of this invention. The corresponding aminovaleric, aminobutyric, aminoheptanoic, aminooctanoic and aminononanoic acids are prepared by known methods by the HCl-catalyzed hydrolysis of the corresponding lactams, which are known in the art. The salts thus obtained are then passed through an ion-exchange resin bed to obtain the free amino acid.

The recommended dosage during the first 24 hours following infarction is as follows:

2–4 grams by phleboclysis; 1–2 ampoules (each ampoule containing 2,000 mg. of the sodium salt of the compound of Example 1 dissolved in sufficient sterilized distilled water to make 10 cc.) dissolved in 400–600 cc. of saline solution.

2–4 grams by intravenous administration; 2–4 ampoules divided into 2–4 administrations (each ampoule containing 1,000 mg. of the sodium salt of the compound of Example 1 dissolved in sufficient sterilized distilled water to make 10 cc.).

2 grams by intramuscular administration; 8 ampoules divided into 4 administrations (each ampoule containing 250 mg. of the sodium salt of the compound of Example 1 and sufficient sterilized distilled water to make 3 cc.).

4–6 grams by oral administration; 8–12 tablets (each tablet containing 500 mg. of the sodium salt of the compound of Example 1 and sufficient excipient to make one tablet).

4–6 grams by oral administration; 8–12 ampoules (each ampoule containing one or two grams of the sodium salt of the compound of Example 1 in sufficient sterilized distilled water to make 10 cc.).

In the third or fourth day after start of therapy, the dosage can be reduced to half the above amounts. The therapy should not be interrupted before the third week after heart infarction has occurred.

Both in the attack phase and in the maintenance stage the therapy can be carried out using one or more of the different forms of administration.

What is claimed is:
1. A compound represented by the formula

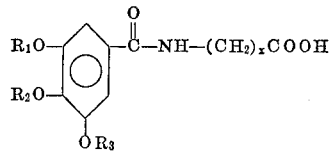

wherein $x$ is an integer of 3–8, and each of $R_1$, $R_2$, and $R_3$ is hydrogen, methyl, ethyl or propyl, provided that only one of $R_1$, $R_2$ and $R_3$ is hydrogen, and pharmaceutically acceptable salts thereof.

2. The compound of claim 1 where $x$ is 5, $R_1$ and $R_3$ are methyl and $R_2$ is hydrogen.

3. The compound of claim 1 wherein the pharmaceutically acceptable salts are sodium or potassium.

4. A compound represented by the formula

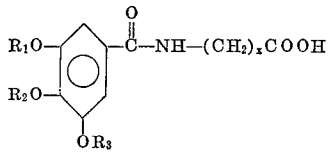

wherein $x$ is an integer of 3–8, and each of $R_1$, $R_2$, and $R_3$ is hydrogen, methyl, ethyl or propyl, provided that only one of $R_1$, $R_2$, and $R_3$ is hydrogen.

References Cited

Finar, I. L.: Organic Chemistry (1963), pub. by R. Clay and Co. of Great Britain, p. 676, relied on.

LORRAINE A. WEINBERGER, Primary Examiner

L. A. THAXTON, Assistant Examiner

U.S. Cl. X.R.

260—404; 424—318, 319